(12) United States Patent
Li et al.

(10) Patent No.: US 8,931,442 B2
(45) Date of Patent: Jan. 13, 2015

(54) V-TYPE BLOCK OF A CRANK CIRCULAR SLIDER MECHANISM AND A CYLINDER LINER, A GROUP OF THE CYLINDER LINER, MECHANICAL EQUIPMENT THEREOF

(75) Inventors: Ming Li, Beijing (CN); Zhengzhong Li, Beijing (CN); Peter Zhimin Tan, Beijing (CN); Huiyuan Miao, Beijing (CN); Dekun Feng, Beijing (CN)

(73) Assignee: Beijing Sinocep Engine Technology Co., Ltd., Beijing (CN)

( * ) Notice: Subject to any disclaimer, the term of this patent is extended or adjusted under 35 U.S.C. 154(b) by 114 days.

(21) Appl. No.: 13/502,904

(22) PCT Filed: Aug. 31, 2010

(86) PCT No.: PCT/CN2010/001324
§ 371 (c)(1),
(2), (4) Date: Jul. 3, 2012

(87) PCT Pub. No.: WO2011/047526
PCT Pub. Date: Apr. 28, 2011

(65) Prior Publication Data
US 2012/0266831 A1 Oct. 25, 2012

(30) Foreign Application Priority Data
Oct. 22, 2009 (CN) .......................... 2009 1 0236200

(51) Int. Cl.
| F02B 75/22 | (2006.01) |
| F02B 75/32 | (2006.01) |
| F02F 1/00 | (2006.01) |
| F04B 35/01 | (2006.01) |

(Continued)

(52) U.S. Cl.
CPC . *F02B 75/32* (2013.01); *F02F 1/00* (2013.01); *F04B 35/01* (2013.01); *F04B 39/12* (2013.01); *F01B 1/06* (2013.01)
USPC .............................................. 123/54.4; 74/49

(58) Field of Classification Search
USPC ............................................... 123/54.4; 74/49
See application file for complete search history.

(56) References Cited

U.S. PATENT DOCUMENTS 4,173,151 A * 11/1979 Grundy ............................. 74/49
4,270,395 A * 6/1981 Grundy ............................. 74/49
4,850,313 A 7/1989 Gibbons ..................... 123/55 R (Continued)

FOREIGN PATENT DOCUMENTS

| CN | 85100358 B | 1/1988 |
| CN | 1144879 A | 3/1997 |

(Continued)

*Primary Examiner* — Marguerite McMahon
*Assistant Examiner* — James Kim
(74) *Attorney, Agent, or Firm* — Fitzpatrick, Cella, Harper & Scinto

(57) ABSTRACT

A V-type block of a crank circular slider mechanism, comprising a piston with a circular slider receiving hole and a circular slider received in the receiving hole, the block having a main journal hole and comprising a group of adjacent cylinders arranged in a V form intersecting in the position of the main journal hole, each of the cylinders in the group penetrating the main journal hole, wherein said cylinders each penetrate the main journal hole with an axial length beyond the main journal hole, which the length is long enough for providing a reciprocating range required for the reciprocating motion of the part of the piston located beneath the receiving hole of the circular slider.

7 Claims, 3 Drawing Sheets

(51) Int. Cl.
*F04B 39/12* (2006.01)
*F01B 1/06* (2006.01)

(56) References Cited

U.S. PATENT DOCUMENTS

| | | | | |
|---|---|---|---|---|
| 5,083,537 | A | * | 1/1992 | Onofrio et al. ............ 123/195 R |
| 5,503,038 | A | * | 4/1996 | Aquino et al. ..................... 74/49 |
| 5,934,229 | A | * | 8/1999 | Li et al. ......................... 123/55.5 |
| 6,082,314 | A | | 7/2000 | Li et al. |
| 6,631,671 | B1 | * | 10/2003 | Vool ............................. 92/165 R |

FOREIGN PATENT DOCUMENTS

| | | |
|---|---|---|
| CN | 1144880 A | 3/1997 |
| CN | 1067741 C | 6/2001 |
| CN | 1429981 A | 7/2003 |
| CN | 101761359 A | 6/2010 |
| CN | 101761409 A | 6/2010 |
| EP | 0 854 277 A1 | 7/1998 |
| WO | WO 94/13966 A1 | 6/1994 |
| WO | WO 2008/085920 A2 | 7/2008 |

* cited by examiner

V-TYPE BLOCK OF A CRANK CIRCULAR SLIDER MECHANISM AND A CYLINDER LINER, A GROUP OF THE CYLINDER LINER, MECHANICAL EQUIPMENT THEREOF

TECHNICAL FIELD

The invention relates to a crank circular slider mechanism, in particular, a V-type block of the crank circular slider mechanism. The invention also provides a cylinder liner and a group of the cylinder liner used in the cylinder with the V-type block. The invention also provides a mechanical equipment making use of the V-type block, the cylinder liner, the group of the cylinder liner.

BACKGROUND ART

Reciprocating internal combustion engines need to convert the reciprocating motion of the piston to the rotary motion of the crankshaft. Under the current general technology, the conversion process needs to use a crank linkage mechanism. Due to the presence of link rods in the crank linkage mechanism, the machines are bulky, heavy, and of poor balance performance.

To address these problems, a Chinese patent document CN85100358B discloses a "Crank circular slider reciprocating piston internal combustion engine", a Chinese patent CN1067741C discloses a "Crank double circular slider reciprocating piston internal combustion engine", and a Chinese patent document CN1144880A discloses a "Crank multi-circular slider reciprocating piston internal combustion engine". The common features of the internal combustion engine is in that a thorough improvement to the crank linkage mechanism of the internal combustion engine under the common technology by using a circular slider with an eccentric round hole to replace the link rod. The eccentric circular slider has a cylindrical shape, and has an eccentric round hole parallel to the axis of the circular slider; the eccentric round hole is designed for passing through the crank pin of the crankshaft. The piston of the internal combustion engine comprises crowns at both of its ends and a guiding portion connecting the two crowns, wherein the guiding portion has a round hole thereon. The inner radial surface of the round hole mates with the outer radial surface of the circular slider, the circular slider is placed in the round hole which is on the guiding portion of the piston and cooperates with an outer radial surface of the circular slider. When the piston moves reciprocally in the cylinder by the push caused by the combustion gas in the cylinder, the eccentric circular slider rotates around its own center, and in turn brings a reverse rotation of the crankshaft, and thus transforms the reciprocating motion of the piston into the rotary motion of the crankshaft, then the power is transmitted outward by the rotating components connected with the crankshaft. The teaching of above mentioned patents can also be applied to the compressors or the vacuumizer, to obtain a crank circular slider compressors or a crank circular slider vacuumizer.

In the crank circular slider mechanism described in the above mentioned patent documents, the piston thereof has a function different from that of the piston of the internal combustion engine of crank linkage mechanism widely used nowadays. The piston in the mechanism functions as not only bearing the explosion pressure of the combustible mixed gas and transforming it to a linear motion, but providing the circular slider with a receiving hole for a circular slider while the crankshaft penetrating the eccentric hole of the circular slider, therefore the piston of the crank circular slider mechanism indirectly supporting the crankshaft by the circular slider arranged in the receiving hole for the circular slider.

In order to adapt to the change of the function of the piston, the structure of the piston of the crank circular slider mechanism is adapted correspondingly. Referring to FIG. 1, it is FIG. 4 of the specification of a Chinese patent document CN85100358B designated as a perspective of the piston of the crank circular slider mechanism. As shown in the figure, the piston of the crank circular slider mechanism comprises a guiding portion 2 and a crown 1 which has a same function as the piston head of the traditional internal combustion engine and whose topside is also referred to as piston top used as an integral part of the combustion chamber and which is provided with a plurality of piston ring grooves in its perimeter, used for arranging the air ring, the oil ring so as to realize the hermetic sealing of the cylinder. In the figure, the crown is provided with the guiding portion 2 thereunder whose block is in form of a thin block which has two sides capable of matching the sliding track of the block and referred to as guiding sides; a round hole having a inner diameter matching the exterior diameter of the circular slider is provided in the centerline of the plan of the thin block, and also referred to as the receiving hole 3 for the circular slider.

To adapt to the structural change of the above mentioned piston, the equipment using the crank circular slider mechanism is obviously different from the equipment using the crank linkage mechanism in terms of the arrangement of the cylinder. In the body of the equipment using the crank circular slider mechanism, the piston should be provided with a receiving hole for receiving the circular slider with the crank pin of the crankshaft penetrating the eccentric hole of the circular slider so that the main journal hole on the block for mounting the crankshaft needs to intersect with the block cylinder providing a piston track, while in the existing crank linkage mechanism, the cylinder does not intersect with the main journal hole. Thereby, in case of using the crank circular slider mechanism, it becomes a problem to be resolved that how the cylinder is arranged in such a way that under the arrangement of the main journal hole traversing the cylinder a sufficient cylinder axial length can be supplied for the piston to reciprocate. The spacial arrangement of the blocks are more complicated, due to the following facts: in particular, under the circumstance of blocks using V-type structure, the adjacent cylinders are arranged in V form, however the cylinder of the crank circular slider mechanism is relatively longer and additionally each of the cylinders needs to intersect with the main journal hole. In prior art, no solution to resolve the above mentioned problem is given.

In using a block with a V-type structure, the circular slider in the piston arranged in the adjacent cylinder needs to be as close as possible to achieve the purpose of minimizing the overall size, while the distance between the adjacent cylinders will exert a considerable effect on the distance between the circular sliders. The larger the distance between the circular sliders is, the more increased the overall size is, which impair the compactness of the block. It is a difficult problem for designing the block of the crank circular slider mechanism to solve that.

Another problem is that how the appropriate cylinder sleeve is designed so as to meet the requirement of designing the cylinder structure without creating the needs to increase the distance between the cylinders due to the addition of cylinder sleeve under the following circumstance: as using the above mentioned block with V-type structure as the block of internal combustion engine, a cylinder sleeve usually is necessary, and the spacial relationship between adjacent cylinders and main journal holes is complicated. Moreover, it is also necessary for the above mentioned cylinder sleeve to be mounted in the cylinder readily without any interference between the adjacent cylinder sleeves causing assembling them difficultly.

The crank circular slider mechanism arranged in the block with the V-type structure usually is realized with a single action piston which means that as seen in FIG. 1 a piston on only one side of which a crown is provided; however in the specific case, the block with V-type structure is also used in a crank circular slider mechanism with a dual action piston which means a piston on each of ends of which a crown is provided. It is a form of piston only the crank-circular slider mechanism has.

SUMMARY OF THE INVENTION

To address these problems above mentioned, the invention provides a V-type block used in the crank circular slider mechanism, which the V-type block satisfies the special requirement that is what the crank circular slider mechanism requires the cylinder so that the cylinder can provide the piston with a sufficient reciprocating length.

In a further advantageous solution of the invention, a structural compact design of the cylinder is proposed; the structure of the crank circular slider mechanism using the V-type block is very compact.

The invention also provides a cylinder sleeve adapting to the above mentioned V-type block, whose preferred solution brings about an ease of mounting.

In particular, a V-type block of a crank circular slider mechanism, comprising a piston with a receiving hole for a circular slider and a circular slider received in the receiving hole, the block having a main journal hole and comprising a group of adjacent cylinders arranged in a V form intersecting in the position of the main journal hole, each of the cylinders in the group penetrating the main journal hole, wherein said cylinders each penetrate the main journal hole with an axial length beyond the main journal hole, which the length is long enough for providing a reciprocating range required for the reciprocating motion of the part of the piston located beneath the receiving hole for the circular slider.

Preferably, the opening in the bottom of the cylinder is provided with an inner rim.

Preferably, the adjacent cylinders overlap partly at the intersection, the staggering gap is arranged so that two adjacent circular sliders can be placed in the intersection.

The invention also proposes a cylinder sleeve used in the V-type block of a crank circular slider mechanism above mentioned, characterized in that the cylinder sleeve is a thin wall cylinder body whose axial length is sized so as to receive the whole reciprocating motion of the piston of the crank circular slider mechanism; the cylinder sleeve is provided with a through hole having an axis intersecting vertically the central axis of the thin wall cylinder body, the through hole is located in the cylinder sleeve in the axial direction permits in such a way that it just faces the main journal hole after the cylinder sleeve fits into the cylinder, the through hole is used for passage of the crank pin of the crankshaft and is also referred to as the crankshaft passage hole; a part of the side wall of the cylinder sleeve is cut out to form an avoidance opening which is located so that one of the two circles where the crankshaft passage hole intersects the cylinder sleeve is cut through by the avoidance opening, the other circle just faces the avoidance opening; in the axial part of the cylinder sleeve in which the avoidance opening lies, the cylinder sleeve, after being cut out by the avoidance opening and the circles is left on the two sides with a width enough for providing a guiding plan for the guiding portion of the piston fit in the cylinder sleeve.

Preferably, that the avoidance opening is obtained by the cutting through with a plan which is parallel to the axis of the cylinder sleeve and vertical to the axis of the crankshaft passage hole.

Preferably, the avoidance opening is in the form of a concave part on the middle of the cylinder sleeve along its axial direction, without reaching the extreme end of the cylinder sleeve.

Preferably, the avoidance opening is located in such a extent to which the cylinder sleeve is divided into three parts: a first part extending from the first end face of the cylinder sleeve to the plan where the first lateral side of the avoidance opening lies in, having a length meeting the requirement for axial movement of the crown of the piston; a second part which is covered by the avoidance opening in the axial direction; a third part extending from the plan of the second lateral side of the avoidance opening to the other end face; the third part of the cylinder sleeve along the axial direction is partly cut into an independent arc portion in such a position which begins with the interface line where the second lateral side of the avoidance opening intersects the bottom line of the avoidance opening and which extends along the naturally extending line of the bottom line of the avoidance opening.

Preferably, the extent to which the avoidance opening lies in the cylinder sleeve along its axial direction divides the cylinder sleeve along its axial direction into three parts: a first part extending from the first end face of the cylinder sleeve to the plan where the first lateral side of the avoidance opening lies in, having a length meeting the requirement for the axial movement of the crown of the piston; a second part covered by the avoidance opening along the axial direction; a third part extending from the plan of the second lateral side of the avoidance opening lies in to the other end face of the cylinder sleeve; the third part in the axial direction of the cylinder sleeve is partly cut into an independent arc part in such a position that begins with the interface line of the second lateral side of the avoidance opening intersects the bottom line of the avoidance opening till the bottom end face of the cylinder sleeve in an angled direction approaching the center axial line of the cylinder sleeve.

The invention also provides a cylinder sleeve group including a first and a second cylinder sleeves, characterized in that the first cylinder sleeve is that as above mentioned, the third part of the first cylinder is not cut; the second cylinder sleeve is that as above mentioned; when assembling, first the first cylinder sleeve is mounted with its avoidance opening facing toward the mounting position of the second cylinder sleeve; then, the cut arc part of the second cylinder sleeve is mounted to its place, then the body of the second cylinder sleeve is mounted partly; at the end of assembling, the bottom lines of the avoidance openings of the two cylinder sleeves are against each other.

The invention also provides a mechanical equipment, characterized in that it using the V-type block of the crank circular slider mechanism; the mechanical equipment can be an internal combustion engine or a compressor.

Preferably, the cylinder of the mechanical equipment comprising the cylinder sleeve group above mentioned.

The V-type block of the crank circular slider mechanism of the invention is provided under the main journal hole with an extension of the cylinder so as to receive the part of the piston under the receiving hole for the circular slider and to provide the part with a track of reciprocating movement, which thus satisfies the requirements of the movement track to the piston of the crank slider mechanism, the total axial length and respective length of each of the parts sufficiently meet the requirements of the length of the track where the piston reciprocates.

In the preferred solution of the invention, the two adjacent cylinders partly overlap at their intersection. The cavity of the overlapping portion is sized so that it can receive two circular sliders being against each other. Such design of the adjacent cylinders overlapping permits the adjacent cylinders have a smaller staggering gap therebetween, resulting in effectively decreasing volume of the crank circular slider mechanism and the block and reducing materials to manufacture the engines.

The cylinder sleeve of the invention is equipped with a crank passage hole and the avoidance opening. These structures permit the cylinder sleeve to adapt to the complicated positional relationship between the adjacent cylinder with the V-type block and the main journal hole, and to be snuggly mounted into the cylinder. In the preferred solution of this cylinder sleeve, a cylinder sleeve made of two parts is provided, which when its falling into the cylinder, can avoid the cylinder sleeve already mounted in the adjacent cylinder, so as to readily mount one cylinder sleeve group in the adjacent cylinders.

DETAILED DESCRIPTION OF THE PREFERRED EMBODIMENTS

The first embodiment of the present application provides a V-type block used for a crank circular slider mechanism, which is designed for mounting a crank circular slider mechanism using a single action piston.

Figure 1:
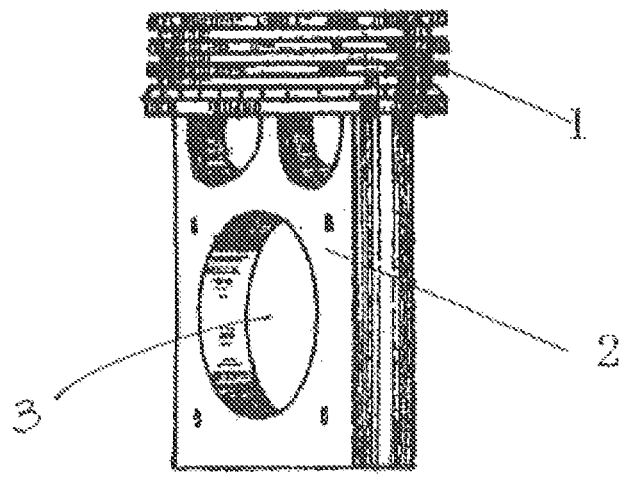
FIG. 1 is a perspective of the piston of the crank circular slider mechanism according to the prior art.
Figure 2:
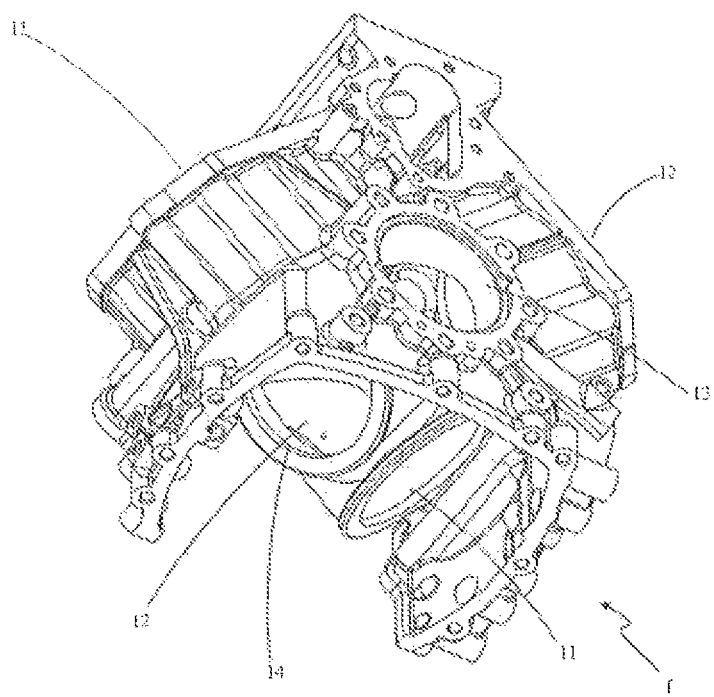
FIG. 2 is a first perspective of the V-type block of the first embodiment of the invention.
Figure 3:
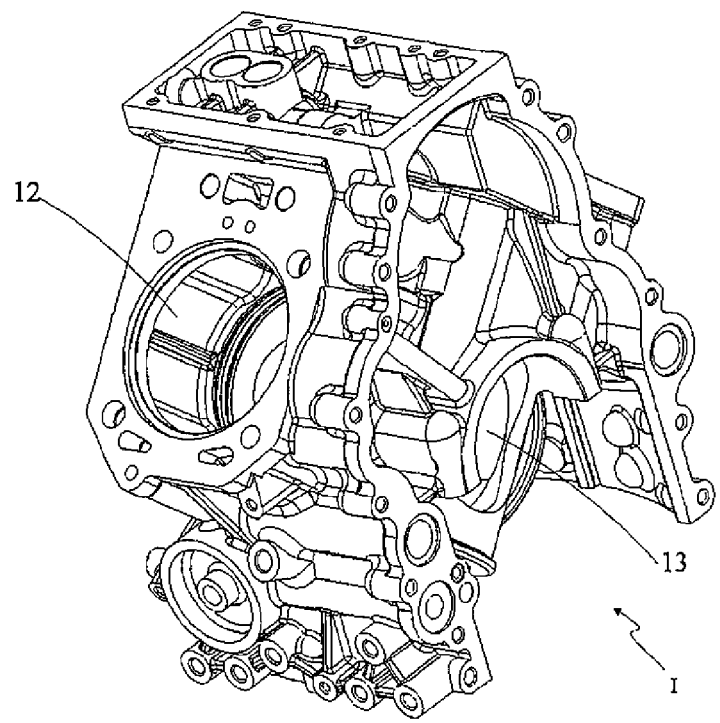
FIG. 3 is a second perspective of the V-type block of the first embodiment of the invention.
Figure 4:
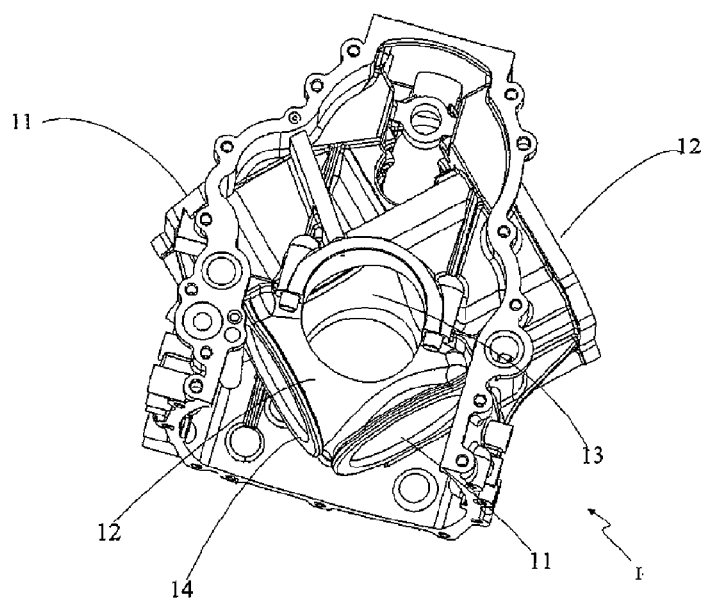
FIG. 4 is a third perspective of the V-type block of the first embodiment of the invention.

Refer to FIG. 2, it is a perspective of the V-type block I according to the first embodiment of the present application, viewing towards the lateral lower part on the side of the back end face of the block I mounting the flying wheel. Simultaneously refer to FIG. 3, it is a lateral view of the front end face of the cover of the mounting gear box of the V-type block. Meanwhile refer to FIG. 4, it is a bottom view of the front end face of the cover of the mounting gear box of the V-type block.

As seen from figures, the block I is the V-type block with dual-cylinder block, comprising two cylinders arranged opposite to each other in form of V, respectively a first cylinder 11 and a second cylinder 12. The two cylinders adjoin and intersect each other. The intersection position lies in the main journal hole 13, as seen from FIG. 4, the main journal hole 13 is vertical to the axis of the first and second cylinders 11 and 12 and penetrate their intersection. The position where the main journal hole 13 cross over the said first and second cylinders is the space for mounting the circular slider of the crank circular slider mechanism. The first cylinder 11 and the second cylinder 12 intersect at the main journal hole 13 and then extend to the lower part of the main journal hole 13, that is, compared with the main journal hole 13, closer to the block part of the oil pan. The extension has an axial length which matches the axial length below the crank receiving hole of the piston to be mounted in the cylinder and matches the piston reciprocating length, and is sized so as to sufficiently receive the whole reciprocating movement of the part of the piston under the receiving hole for the circular slider following the piston. The part under the receiving hole for the circular slider, that is, the part of the piston closer to the oil pan of the block after mounted into the block.

The end face of the part by which the first cylinder 11 and the second cylinder 12 extend under the main journal hole 13, that is the end of the cylinder, has a bottom opening, which faces the bottom of the block fitting with the oil pan, and which is provided with an inner edge 14.

The first cylinder 11 and the second cylinder 12 overlap at the intersection, that is, the cylindrical forms thereof coincide at the intersection. The gap which staggers the two adjacent cylinders is smaller than the diameter of any one of the cylinders; however the gap is sized so as to permit the portion where the two cylinders stagger each other to receive the width of the two adjoining circular sliders, that is, any one of the two circular sliders mounted in the space staggering the cylinders will not go beyond the boundary within which the cylindrical surface of the cylinder extends in the space. After mounting, the two adjacent circular sliders snug each other in the space staggering the cylinders and become an integral one. The gap staggering the cylinders is a distance between the central axes of the two cylinders.

The V-type block better resolve the following questions: in the crank circular slider mechanism, the difficulty of arranging the V-type block due to the significant length of the cylinder. Therefore the V-type block causes itself to be used in the crank circular slider mechanism and hence obtain an advantage of structural compactness.

After the above mentioned V-type mechanism is used in the internal combustion engine, cylinder sleeve conventionally is mounted in the cylinder. Such structure results in many difficulties in terms of the mounting of the cylinder sleeve. Since the two adjacent cylinders have an overlapping portion, the cylinder sleeve of the second cylinder will be hindered by the cylinder sleeve mounted in the first cylinder so as not to reach the bottom after the first cylinder is installed with a cylinder sleeve. Therefore, it is necessary to design a specific cylinder sleeve.

Figure 5:
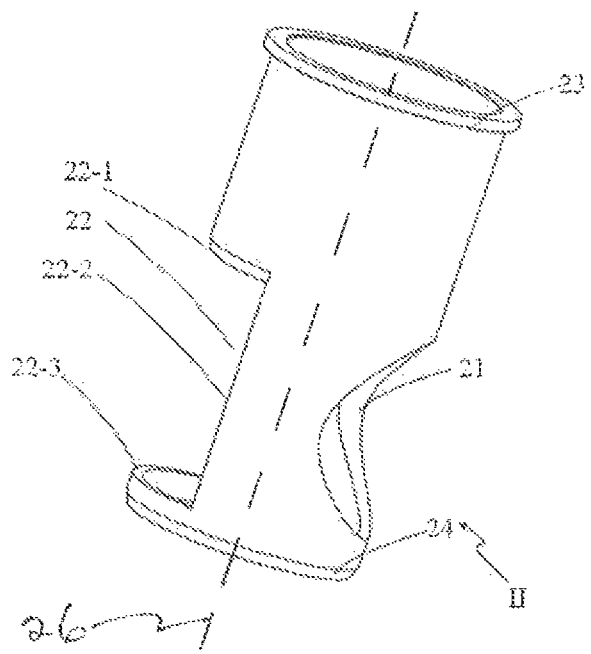
FIG. 5 is a perspective of a cylinder sleeve according to the second embodiment of the invention.

Refer to FIG. 5, it illustrates a perspective of a cylinder sleeve of the second embodiment of the application. As seen from FIG. 5, the cylinder sleeve II is a thin wall cylinder whose axial length matches the cylinder to be mounted into the cylinder sleeve, the axial length of the cylinder sleeve II far longer than the cylinder of the inner combustion engine using crank linkage mechanism. The length allows the whole piston of the crank circular slider mechanism to reciprocate along the axial direction. The cylinder sleeve II is provided on the outer diametrical surface at its one end with a protruding ring which can be stifled by the top end of the cylinder when the cylinder sleeve II is mounted into the cylinder so as to provide an axial orientation for the cylinder sleeve II. Therefore, the protruding ring is also referred to as the bearing shoulder 23. The end face provided with the bearing shoulder 23 is the top end face of the cylinder sleeve to which another end face is opposite, referred to as the bottom end face of the cylinder sleeve. The edge which is formed by the face that the lateral side of the thin wall cylinder body intersects the bottom end face of the cylinder sleeve is provided with a guiding chamfer 24 rendering the cylinder sleeve II to readily be inserted into the cylinder.

The cylinder sleeve II is provided with a through hole whose axis intersects, at a right angle, the central axis 26 of the thin wall cylinder body. The through hole will just faces the main journal hole 13 after the cylinder sleeve is mounted into the cylinder. It is only by adjusting the cylinder sleeve II in the circumferential direction suitably that the through hole is coaxial with the main journal hole 13. The through hole on the cylinder sleeve II above mentioned is used for passage of the crankshaft crank pin, is also referred to as the crankshaft passage hole 21. A part of the lateral wall of the cylinder sleeve II is cut so as to form the avoidance opening 22 by a plan parallel to the axis of the cylinder sleeve II and vertical (i.e., perpendicular) to the axis of the crankshaft passage hole 21 in an intercepted position and an intercepted depth required as follows: one of two intercepted circles by which the crankshaft passage hole 21 intersects the cylinder sleeve is cut out by the avoidance opening 22, the other one just faces it; the axial section of the cylinder sleeve II where the avoidance opening 22 lie, has a width formed by the two lateral sides, providing a guiding track surface for the guiding portion of the piston mounted in the cylinder sleeve II, after the lateral wall of the cylinder sleeve II is removed by the avoidance opening 22 and the intercepted circle.

The avoidance opening 22 is situated in the middle part of the cylinder sleeve II in the axial direction, without reaching the extreme end of the cylinder sleeve. Therefore, the avoidance opening 22 is a U-form portion comprising a first lateral side 22-1, a second lateral side 22-3 and a bottom side 22-2. It is divided into three sections in the axial direction of the cylinder sleeve II, that is, respectively a first section which is limited from the first end face of the cylinder sleeve with the support shoulder 23 to the plan in which the first lateral side of the avoidance opening lies, and with a length satisfying that required for the axial movement of the crown of the piston; a second section which is an axial range covered by the avoidance opening 22; and a third section which is an axial range from the plan in which the second lateral side 22-2 of the avoidance opening 22 lies in to the other end face of the cylinder sleeve. Wherein, the third section is the shortest one.

The cylinder sleeve II in the above mentioned embodiment enables the avoidance openings of the adjacent cylinder sleeves to approach to each other or even contact each other by the bottom side 22-2 when the cylinder sleeve II is used in the V-type block. As a result, the intersections of the two cylinder sleeves II are provided with a mutually embedded gap cooperating with the smaller staggering gap of the cylinders. Thus, when two cylinder sleeves II of this type cooperates, a cylinder sleeve group is obtained.

The cylinder sleeve in the second embodiment can realize its functions at the static mounting position, however no account of how to fix it into the cylinder is taken. Actually, since the third section is a complete circle, after the first cylinder sleeve II is fixed into the cylinder and the cylinder sleeve II to be fixed in the adjacent cylinder needs to be inserted into the cylinder, the third section will partly interfere with the avoidance opening 22 of the cylinder sleeve II already fixed so that the cylinder sleeve II is hardly mounted. The problem of the above mentioned mounting can be resolved by designing the block I in the following way: a dismountable cover can be located at the respective place as a part constituting the block I, the cylinder sleeve II to be fixed later then is mounted prior to mounting the cover, so that the cylinder sleeve group of the second example can be used. Obviously, the solution significantly increases the difficulty of designing the block and manufacturing it, thereby it is an unreasonable solution.

The third embodiment of the application proposes a cylinder sleeve which cooperates with that in the second embodiment, better resolving the problem with interference during mounting.

Figure 6:
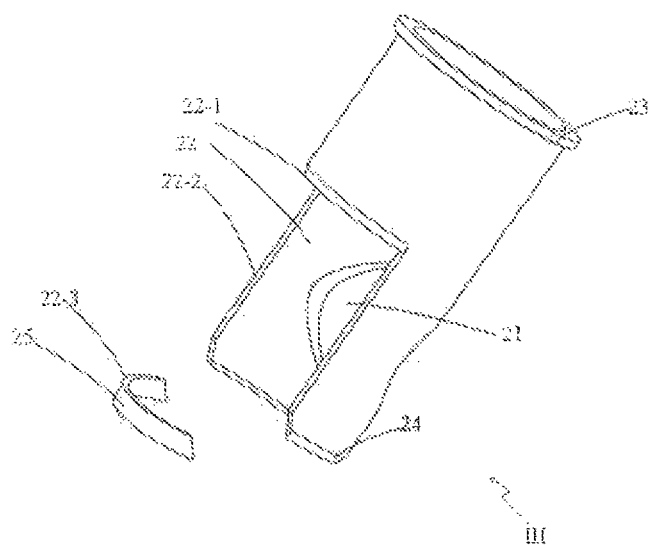
FIG. 6 is a perspective of another cylinder sleeve according to the third embodiment of the invention.

Refer to FIG. 6, the cylinder sleeve III in it is nearly similar as that in the second embodiment but the third section of the cylinder sleeve III, in other words, the section from the second lateral side 22-3 of the avoidance opening 22 to the end face without the support shoulder 23, is cut to form a separate arc 25 whose intercepted position extends from the intersecting line which the second lateral side 22-3 of the avoidance opening 22 intersects the bottom side 22-2 of the avoidance opening 22 to the bottom end face of the cylinder sleeve in an angled direction approaching the central axis of the cylinder sleeve III. Since the arc 25 is detachable from the whole cylinder sleeve III, in the V-type block, first a cylinder sleeve II of the second embodiment is mounted into a cylinder, then orients its avoidance opening 22 towards the adjacent cylinder in which is mounted the cylinder sleeve III of the present embodiment. The specific mounting process is as follows: first of all, put the arc 25 in the bottom end opening of the cylinder to be mounted into the cylinder sleeve while the inner side 14 is used as the location plan of the arc 25; then insert the body of the cylinder sleeve III into the cylinder so that the third section of the cylinder sleeve III will not interfere with the avoidance opening of the cylinder sleeve II since the part above the avoidance opening 22 of the third section of the cylinder sleeve III is already cut away; therefore, the avoidance opening 22 of the cylinder sleeve III can smoothly approach and pass the avoidance opening 22 of the already fixed cylinder sleeve II till the two avoidance openings of the two cylinder sleeves become closely next to each other or contact in the final mounting position so that the distance between the said cylinder sleeves is minimized to meet the requirements of reducing the size of the body. After insertion of the cylinder sleeve III, its third section is complementary to the arc 25 already mounted in the bottom of the cylinder so that a complete cylinder sleeve is formed. The angled degree of the interface line between the arc 25 and the cylinder III body plays a role of guidance so that the mounting and cooperation of the both are smooth. In fact, the interface line can be straight line, in other words, a natural extension of the bottom side 22-2 is directly used as the interface line. In so doing, more trouble will occur obviously, any offset of the mounting position of the arc 25 will result in difficulty of the cylinder sleeve III body arriving at the bottom of the cylinder.

The cylinder sleeves of the second embodiment and the third embodiment combines in pairs so as to obtain the embodiment of the cylinder sleeve group.

The embodiment of the internal combustion engine and compressor of the present application can be obtained by utilizing the body in the first embodiment in the internal combustion engine or compressor with the crank slider mechanism.

The above mentioned embodiments of the present application each have V-type blocks of a pair of cylinders arranged in the V form. Actually, the V-type block can be one with two or several pairs of cylinders arranged in the form of V, for example, a plurality of V-type cylinders can be arranged along the extension of the axis of the crankshaft. Of course, any other prior arts or possible technologies in the future can be used to arrange two or more pairs of the V-type cylinders which will also fall in the range defined by the embodiments above mentioned.

Although in the above mentioned embodiments, the piston mounted in the V-type cylinder is assumed to be a single action piston, the structures of the above mentioned cylinders also apply to the dual action piston cylinder. Meanwhile, the structure thereof is the same as the embodiments above mentioned except for that the axial length by which the cylinder extends beyond the under part of the main journal hole is required to be designed in accordance with the need of designing the combustion chamber, for example, according to the arrangement of the cylinder above the main journal hole. At the same time, the part of the cylinder under the main journal hole also needs to be designed as a part of the combustion chamber.

The above mentioned is only the preferred embodiments of the present invention, it should be noted that the skilled in the art can also make many improvements and modifications without departure from the basic theory of the present invention, these improvements and modifications will be also be considered as the protections scope of the invention.

What is claimed is:

1. A cylinder sleeve used in a V-type block of a crank circular slider mechanism, the V-type block including a piston, which has a receiving hole for receiving a circular slider therein, a block having a main journal hole, and a group of adjacent cylinders arranged in a V form intersecting at an intersection portion of the main journal hole, each of the cylinders in the group of adjacent cylinders extending through the main journal hole respectively, wherein the cylinders each extend through the main journal hole with an axial length beyond the main journal hole, the axial length being long enough for providing a reciprocating range required for reciprocating motion of a part of the piston located beneath the receiving hole, the cylinder sleeve comprising:
    a thin wall cylinder body whose axial length is sized so as to receive the piston of the crank circular slider mechanism and to accommodate an entirety of the reciprocating motion, the thin wall cylinder body of the cylinder sleeve being provided with a through hole having an axis intersecting perpendicularly a central axis of the thin wall cylinder body,
    wherein the through hole is located in the cylinder sleeve in an axial direction such that the through hole faces the main journal hole and is coaxial with the through hole after the cylinder sleeve is fitted with a corresponding cylinder, the through hole being structured for passage of a crank pin of a crankshaft and is also referred to as a crankshaft passage hole, and
    wherein a part of a side wall of the cylinder sleeve is cut out to form an avoidance opening, which is located so that a circle corresponding to a perimeter of the crankshaft passage hole faces the avoidance opening, and so that the avoidance opening is structured to accommodate a second cylinder sleeve that intersects the cylinder sleeve, and
    wherein the cylinder sleeve having the avoidance opening and the crankshaft passage hole includes two sides with a width sufficient for providing a guiding plan for a guiding portion of the piston fitted in the cylinder sleeve.

2. The cylinder sleeve of claim 1, wherein the avoidance opening is obtained by the cutting through with a plan that is parallel to the central axis the thin wall cylinder body of the cylinder sleeve and perpendicular to the axis of the crankshaft passage hole.

3. The cylinder sleeve of claim 2, wherein the avoidance opening has a form of a concave part on a middle section of the cylinder sleeve along an axial direction of the cylinder sleeve, without reaching an extreme end of the cylinder sleeve.

4. The cylinder sleeve of claim 3, wherein the avoidance opening is located in the axial direction of the cylinder sleeve such that the cylinder sleeve is divided into three parts:
    a first part extending from a first end face of the cylinder sleeve to a plan where a first lateral side of the avoidance opening lies, the first part having a length meeting a requirement for axial movement of a crown of the piston;
    a second part spanning the avoidance opening in the axial direction of the cylinder sleeve; and
    a third part extending from a plan of that includes a second lateral side of the avoidance opening to a second end face of the cylinder sleeve,
    wherein the third part of the cylinder sleeve along the axial direction of the cylinder sleeve is partly cut into an independent arc portion, the independent arc portion beginning from an interface line where the second lateral side of the avoidance opening intersects a bottom line of the avoidance opening and extending along a naturally extending line of the bottom line of the avoidance opening.

5. The cylinder sleeve of claim 3, wherein an extent to which the avoidance opening lies in the cylinder sleeve along the axial direction of the cylinder sleeve divides the cylinder sleeve along its axial direction into three parts:
    a first part extending from a first end face of the cylinder sleeve to a plan where a first lateral side of the avoidance opening lies, the first part having a length meeting a requirement for axial movement of a crown of the piston;
    a second part spanning the avoidance opening along the axial direction of the cylinder sleeve; and
    a third part extending from a plan in which a second lateral side of the avoidance opening lies to a second end face of the cylinder sleeve,
    wherein the third part in the axial direction of the cylinder sleeve is partly cut into an independent arc part, such that the independent arc part begins at an interface line of the second lateral side of the avoidance opening, intersects a bottom line of the avoidance opening to a bottom end face of the cylinder sleeve in an angled direction approaching the central axis of the thin wall cylinder body of the cylinder sleeve.

6. A cylinder sleeve group comprising:
    a first cylinder sleeve; and
    a second cylinder sleeve,
    wherein the first cylinder sleeve is a cylinder sleeve used in a V-type block of a crank circular slider mechanism that includes:
        a piston with a receiving hole for receiving a circular slider therein,
        a main journal hole, and
        a group of adjacent cylinders arranged in a V form intersecting in a position of the main journal hole, each of the cylinders in the group of adjacent cylinders extending through the main journal hole respectively, wherein the cylinders each extend through the main journal hole with an axial length beyond the main journal hole, the axial length being long enough for providing a reciprocating range required for reciprocating motion of a part of the piston located beneath the receiving hole,
    wherein the first cylinder sleeve includes:
        a thin wall cylinder body whose axial length is sized so as to receive an entirety of the reciprocating motion of the piston of the crank circular slider mechanism, a through hole having an axis intersecting vertically with a central axis of the thin wall cylinder block, the through hole being located in the first cylinder sleeve in an axial direction in such a way that the through hole is permitted just to face the main journal hole after the first cylinder sleeve fits into a cylinder, the through hole being used for passage of a crank pin of the crankshaft and also is referred to as a crankshaft passage hole, a part of a side wall of the cylinder sleeve is cut out to form an avoidance opening, which is located so that a first of two circles where the crankshaft passage hole intersects the first cylinder sleeve coincides with the avoidance opening, and a second of the two circles corresponds to the through hole and faces the avoidance opening, and in an axial part of the cylinder sleeve in which the avoidance opening lies, the first cylinder sleeve, having the avoidance opening and the through hole, is left on two sides with a width enough for providing a guiding plan for a guiding portion of the piston when fitted in the first cylinder sleeve;

wherein the second cylinder sleeve is that as recited in accordance with claim 4;

wherein the third part of the first cylinder is not cut; and wherein, when assembling, first the first cylinder sleeve is mounted with its avoidance opening facing toward a mounting position of the second cylinder sleeve, then a cut arc part of the second cylinder sleeve is mounted to its place, then a block of the second cylinder sleeve is mounted partly, and, when the assembling is completed, bottom lines of the avoidance openings of the first and second cylinder sleeves are against each other.

7. The mechanical equipment comprising a V-type block of a crank circular slider mechanism that includes:

a piston with a receiving hole for receiving a circular slider therein, a main journal hole, and a group of adjacent cylinders arranged in a V form intersecting in a position of the main journal hole, each of the cylinders in the group of adjacent cylinders extending through the main journal hole respectively, wherein the cylinders each extend through the main journal hole with an axial length beyond the main journal hole, the axial length being long enough for providing a reciprocating range required for reciprocating motion of a part of the piston located beneath the receiving hole, wherein each cylinder of the mechanical equipment includes the cylinder sleeve group according to claim 6, and wherein the mechanical equipment is an internal combustion engine or a compressor.

* * * * *